(12) United States Patent
Pronkine (10) Patent No.: US 9,092,650 B2
(45) Date of Patent: Jul. 28, 2015

(54) METHODS AND APPARATUS FOR AUTOMATED DETECTION OF THE PRESENCE AND TYPE OF CAPS ON VIALS AND CONTAINERS

(75) Inventor: Viatcheslav Pronkine, Edgewater, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 565 days.

(21) Appl. No.: 13/143,215

(22) PCT Filed: Jan. 5, 2010

(86) PCT No.: PCT/US2010/020067
§ 371 (c)(1),
(2), (4) Date: Jul. 5, 2011

(87) PCT Pub. No.: WO2010/080741
PCT Pub. Date: Jul. 15, 2010

(65) Prior Publication Data
US 2011/0267450 A1 Nov. 3, 2011

Related U.S. Application Data

(60) Provisional application No. 61/142,694, filed on Jan. 6, 2009.

(51) Int. Cl.
*G06K 9/00* (2006.01)
(52) U.S. Cl.
CPC .................................... *G06K 9/00* (2013.01)
(58) Field of Classification Search
CPC ................... G06T 7/0004; G06T 2207/30164; G06K 9/00; B23P 19/041; G01B 11/02

USPC ............................... 348/86; 700/245; 358/1.3
IPC ........................................................ H04N 7/18
See application file for complete search history.

(56) References Cited

U.S. PATENT DOCUMENTS

| 5,204,911 | A | * | 4/1993 | Schwartz et al. ............. 382/142 |
| 5,369,713 | A | * | 11/1994 | Schwartz et al. ............. 382/142 |
| 5,638,459 | A | | 6/1997 | Rosenlof et al. |
| 5,848,193 | A | | 12/1998 | Garcia |
| 5,859,924 | A | | 1/1999 | Liu et al. |
| 6,599,476 | B1 | | 7/2003 | Watson et al. |

(Continued)

FOREIGN PATENT DOCUMENTS

| CN | 101063662 A | 10/2007 |
| JP | H09-269209 | 10/1997 |

(Continued)

OTHER PUBLICATIONS

Japanese Office Action dated Aug. 20, 2013 for Japanese Application No. 2011-545388 (3 Pages).

(Continued)

*Primary Examiner* — Jay Patel
*Assistant Examiner* — Neil Mikeska
(74) *Attorney, Agent, or Firm* — Dugan & Dugan, P.C.

(57) ABSTRACT

Methods, systems and apparatus for determining the presence of a cap on a container are provided. An exemplary method comprises capturing an image of an object; extracting an area of interest from the image; determining from the image a position of one or more edges of the object; and determining the presence of a cap based on a comparison of the one or more edge positions to reference data. Numerous other aspects are provided.

18 Claims, 5 Drawing Sheets

(56) References Cited

U.S. PATENT DOCUMENTS

| | | | |
|---|---|---|---|
| 2005/0058350 A1* | 3/2005 | Dugan et al. | 382/224 |
| 2006/0259195 A1* | 11/2006 | Eliuk et al. | 700/245 |
| 2007/0223816 A1 | 9/2007 | Horovitz et al. | |
| 2007/0286495 A1 | 12/2007 | Pine et al. | |
| 2008/0068622 A1* | 3/2008 | Deng et al. | 358/1.3 |
| 2009/0273668 A1* | 11/2009 | Mirtich et al. | 348/86 |
| 2009/0324032 A1* | 12/2009 | Chen | 382/128 |

FOREIGN PATENT DOCUMENTS

| | | |
|---|---|---|
| JP | H11-014346 | 1/1999 |
| JP | H11-083461 | 3/1999 |
| JP | H11-086000 | 3/1999 |
| JP | 2001-118075 A | 4/2001 |
| JP | 2005-309746 A | 11/2005 |

OTHER PUBLICATIONS

International Search Report, International Application No. PCT/US10/020067.

English translation of Chinese Office Action dated Apr. 8, 2014 of corresponding Chineses Patent Application No. 201080010507.5, 17 Pages.

* cited by examiner

| vertical 1 | vertical 2 | vertical 3 | width 1 | width 2 | width 3 | Cap Color | Color_Wei | Name | descriptor | text to display |
|---|---|---|---|---|---|---|---|---|---|---|
| 122 | 88 | 0 | 134 | 53 | 0 | 301 | 20 | Vacuette | cap | Vacuette short tube short red cap |
| 122 | 88 | 0 | 134 | 53 | 0 | 86 | 20 | Vacuette | cap | Vacuette short tube short green cap |
| 122 | 88 | 0 | 134 | 53 | 0 | 0 | 0 | Vacuette | cap | Vacuette short tube short unknown color cap |
| 88 | 0 | 0 | 158 | 0 | 0 | 0 | 0 | Vacuette | no cap | Vacuette short tube no cap |
| 116 | 88 | 0 | 136 | 73 | 0 | 299 | 20 | Vacutainer | cap | Vacutainer short tube long red cap |
| 116 | 88 | 0 | 136 | 73 | 0 | 359 | 20 | Vacutainer | cap | Vacutainer short tube long yellow cap |
| 116 | 88 | 0 | 136 | 73 | 0 | 345 | 20 | Vacutainer | cap | Vacutainer short tube long pale yellow cap |
| 83 | 0 | 0 | 159 | 0 | 0 | 0 | 0 | Venosafe | no cap | Venosafe short tube no cap |
| 116 | 89 | 0 | 133 | 73 | 0 | 301 | 20 | Vacutest | cap | Vacutest short tube long red cap |
| 90 | 0 | 0 | 157 | 0 | 0 | 0 | 0 | Vacutest | no cap | Vacutest short tube no cap |
| 125 | 92 | 0 | 140 | 25 | 0 | 210 | 20 | Vacutainer | cap | Vacutainer short narrow tube lavender plug |
| 125 | 92 | 0 | 140 | 25 | 0 | 46 | 20 | Vacutainer | cap | Vacutainer short narrow tube green plug |
| 125 | 92 | 0 | 140 | 25 | 0 | 311 | 20 | Vacutainer | cap | Vacutainer short narrow tube terra-red plug |
| 125 | 92 | 0 | 140 | 25 | 0 | 0 | 0 | Vacutainer | cap | Vacutainer short narrow tube unknown color plug |
| 85 | 0 | 0 | 160 | 0 | 0 | 0 | 0 | Vacutainer | no cap | Vacutainer short narrow tube no cap |

FIG. 5

METHODS AND APPARATUS FOR AUTOMATED DETECTION OF THE PRESENCE AND TYPE OF CAPS ON VIALS AND CONTAINERS

FIELD OF THE INVENTION

The present invention relates to detection methods, and more specifically to methods and apparatus for automatically detecting the presence and type of caps on vials and other containers.

BACKGROUND

Various tests may be performed on a sample for diagnostic purposes, routine care, research, etc. In the medical field, the sample may include, for example, blood, urine, DNA, feces, tissue, etc. In other fields, such as bio-terrorism, samples may include, for example, air, water, soil, etc. Frequently, as part of the test, the sample may be mixed with a reagent to produce an outcome. In an in vitro setting, the mixing may take place outside of a patient's body, for example. Additionally, the different tests may require different quantities of a sample, which may be collected in various containers, having various caps. These containers and caps may have identifying features, such as shape, color, markings, etc. These identifying features may be useful to further identify the contents of the container, as well as for automated/robot handling.

The inventors of the present invention have determined that an existing deficiency of conventional automated image processing systems is their fundamental methodology limitations, namely, that they perform a large number of complex operations on the image to determine the presence and/or identity of the cap and/or container. Accordingly, a need exists for an improved method and apparatus for determining the presence and/or type of cap and/or container.

SUMMARY OF THE INVENTION

In an aspect of the present invention, a method for determining the presence of a cap on a container is provided. The method comprises capturing an image of an object; extracting an area of interest from the image; determining from the image a position of one or more edges of the object; and determining the presence of a cap based on a comparison of the one or more edge positions to reference data.

In another aspect of the present invention, a system for determining the presence of a cap on a container is provided. The system comprises an image capture apparatus adapted to capture an image of an object, wherein the image is represented as a 2-D array of intensities of light; and a controller coupled to the image capture apparatus, wherein the controller is adapted to extract an area of interest from the image, determine a position of edges of the object; compare the edge positions to reference data; and determine the presence of a cap based on the comparison of the edge positions to reference data.

Other features and aspects of the present invention will become more fully apparent from the following detailed description, the appended claims, and the accompanying drawings.

DETAILED DESCRIPTION

The present invention provides systems and methods for automatically determining the presence and type of caps on vials and other containers. As described above, in some embodiments, the shape of a container or cap may indicate the contents of the container. In particular, the present invention provides a method whereby an image of a container and/or cap is captured. The image may be captured by any conventional means (e.g. video camera, digital still camera, line scanner, etc.). By capturing an image of the container and/or cap, the container and/or cap features may be observed without physical contact, which may make the system more efficient as physical contact may slow the identification process.

In some embodiments, the image may be converted into a 2-D array of light intensities. An area of interest may then be extracted or cropped from the 2-D array. In some embodiments the extraction may be based on major horizontal features, and if necessary, the geometry of the area of interest may be adjusted. The resulting array may have a location and orientation that is consistent with the object (container and/or cap) located and oriented in front of the image capture mechanism, for example. The extraction of the area of interest may remove noise or artifacts from the background of the image, which may thereby make the features of the container and cap more prominent.

In some embodiments, the area of interest may be determined, and thereafter extracted, based on a difference of light intensities between the object and the background, for example, where the measured difference may be above a particular threshold value. The area of interest array may include one or more straight-line features, for example, such as horizontal and vertical lines indicative of the major edges of the container and/or cap. As used herein, "major edges," refers to the edges that substantially delineate the container and/or cap. For example, a notch in a lip of a container may increase the number of existing edges, but is not itself a "major edge." The relationship between the lines, as well as the ratios of the measured straight-line features to each other may be determined, as will be further described below. In some embodiments, the use of ratios of the straight-line features or dimensions to identify containers and/or caps may be advantageous in that the ratios may be immune to variations in the images produced by image manipulation (i.e., parallax and zoom, etc.), thereby simplifying processing.

The sets of relationships and/or ratios of the different dimensions may be reported as a single relationship or a vector. This vector may be compared to reference data to determine the identification of the container and/or cap positioned in front of the camera.

In some embodiments, the area of interest may also include one or more predominant colors. For example, some caps may have one predominant color and large spots in a second color. In some embodiments, all of the color vectors present in an area of interest may be analyzed to determine predominant color and a second major color, as further described below. In some embodiments, each of the colors may be translated into color vectors.

In some embodiments, the color vectors and the single relationship and/or ratio vector may be combined into a single multidimensional vector. The multidimensional vector may be compared to reference data to determine the identification of the container and/or cap, positioned in front of the camera. In some embodiments, multiple multidimensional references may be used to identify different combinations of the containers and/or caps. Multiple multidimensional processing may be done in parallel or in series, for example.

In some embodiments, the process described above may be triggered or activated by the positioning of the object (container and/or cap, for example) in front of the image capture mechanism. In alternative embodiments, the process may be repeated cyclically and endlessly to identify, or report matching, objects in "real" time.

Figure 1:
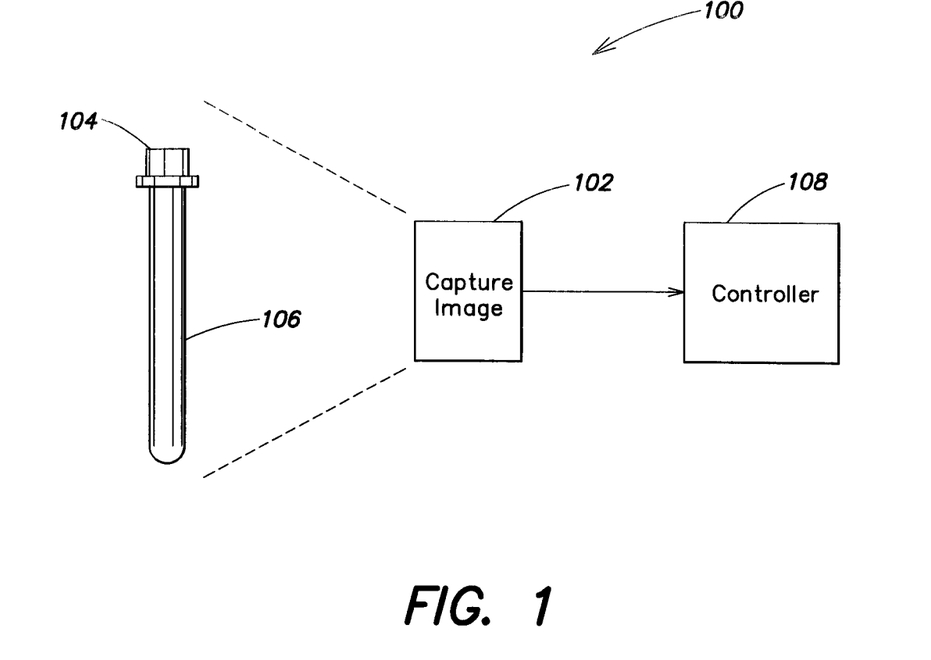
FIG. 1 is a block diagram illustrating a system for determining the presence and type of cap according to some embodiments of the present invention.

Turning to FIG. 1, a schematic view illustrating a system 100 for determining the presence and type of a cap on a container according to some embodiments of the present invention is provided. The system 100 may include an image capture apparatus 102, to capture an image of a cap 104 and a container 106.

As described above, the image capture apparatus 102 may be any conventional image capture means. For example, the image capture apparatus 102 may be a video camera, a digital still camera, a line scanner, etc. In some embodiments, the system 100 may include one or more image capture apparatuses 102 to capture the images of one or more containers 106 and caps 104, if present. Conventional vision systems may capture the image as a 2-D array. In other embodiments, for example when the image is captured through a single line optical sensor (i.e. line scan array), the image may be interpolated horizontally through a cylindrical lens. In this case, the data from the image will always be present only in 1-D.

The captured image may depict the container 106, or a portion thereof, and the cap 104, if the cap 104 is present. In some embodiments the container 106 may contain a sample (not shown). The sample may include, for example, blood, urine, DNA, feces, tissue, air, water, soil, etc. Any other suitable sample may be used. In other embodiments, the container 106 may be empty. The container 106 may be any container suitable to retain the sample therein.

In some embodiments, the system 100 may further include a light source (not shown). The light source may illuminate the cap 104 and the container 106, to further highlight the major edges.

The system 100 may also include a controller 108. In some embodiments, the system 100 may be operated by the controller 108, which may be coupled to and/or otherwise communicate with and/or control the various components of the system 100. The controller 108 may also be adapted to receive the image data from the image capture apparatus 102 and analyze the data to determine the major edges of the cap 104 (if present) and container 106 such that the type of cap 104 and container 106 may be determined, as will be further described below. The controller 108 may be a microcomputer, microprocessor, logic circuit, a combination of hardware and software, or the like. The controller 108 may include various communications facilities including input/output ports, a keyboard, a mouse, a display, a network adapter, etc.

Figure 2:
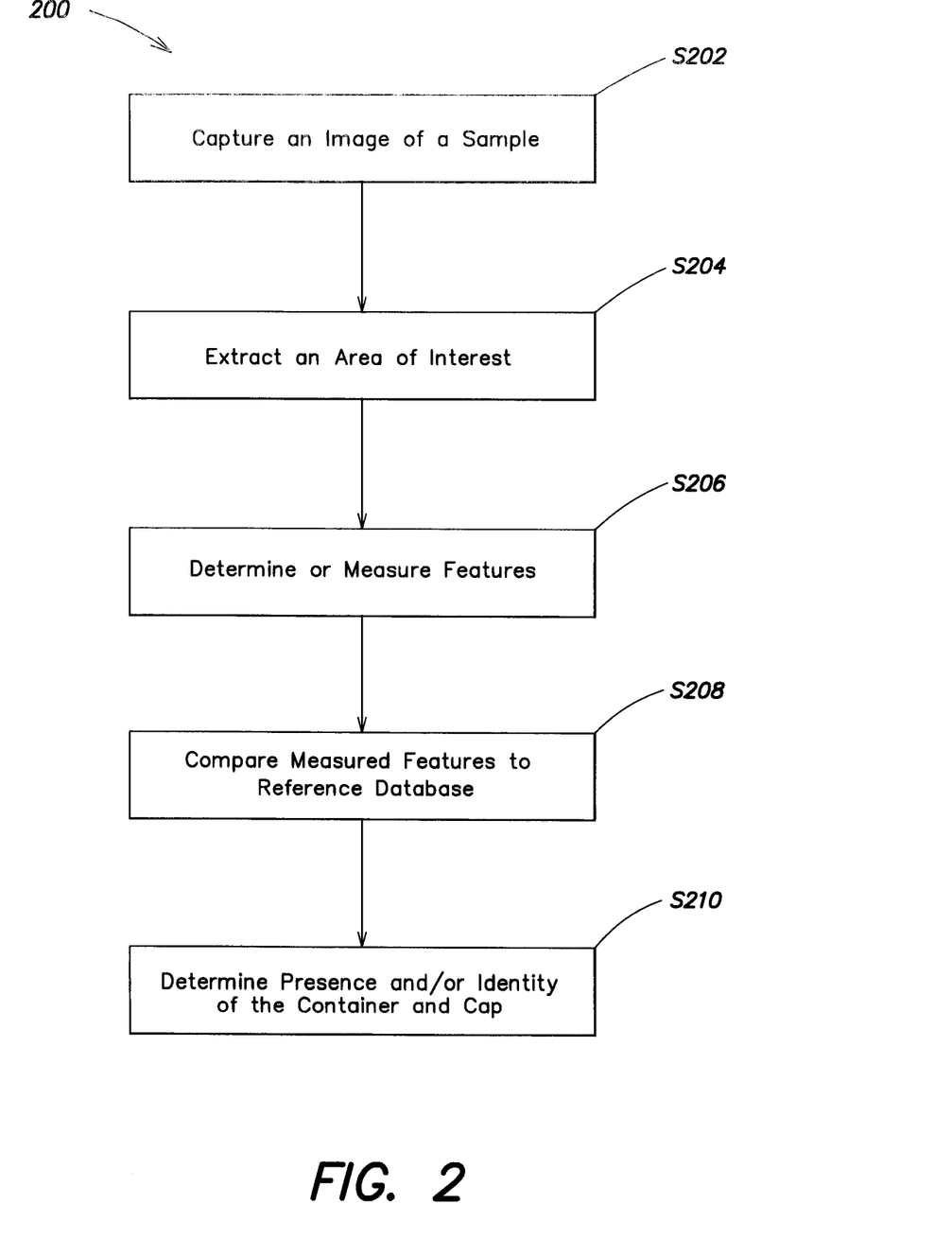
FIG. 2 is a flowchart depicting an example method in accordance with some embodiments of the present invention.

Turning to FIG. 2, a flowchart depicting an example method 200 is provided. As described above, a sample may be contained in the container 106, or the container may be empty. In step S202, the image capture apparatus 102 captures an image of the cap 104 and container 106 (FIG. 1). In some embodiments, the captured image may be represented graphically as scan lines (pixels), for example. Additionally or alternatively, the captured image may be converted to a 2-D array and be represented as different intensities of light. The information from the image may be referred to as a "signal."

In step S204, an area of interest may be extracted from the image or the 2-D array. In some embodiments, to extract the area of interest, the image of the container 106 (and cap 104) may be parsed into three vertically stacked sections, for example, as indicated by the sections labeled V1, V2 and V3, and delineated by dotted lines in FIG. 3, and then searched for major horizontal features, for example. Any suitable number of sections in any suitable plane may be used. In some embodiments, the signal may be graphically represented on a histogram, for example. Any major horizontal features, for example, may be represented as a spike or peak on the histogram. However, the signal may include unavoidable noise/interference/minor features, which may be present in any system, and may make detection of the major edges more difficult. Therefore, to correct for the noise, the signal may be masked, for example, by multiplying the signal by a result of a threshold (e.g., a comparing function), for example. The resulting signal may then be searched for local peaks, based on peak height, for example. The controller 108 may include an algorithm to process those peaks, for example. The algorithm may have simple rules of arbitrary logic.

Figure 3:
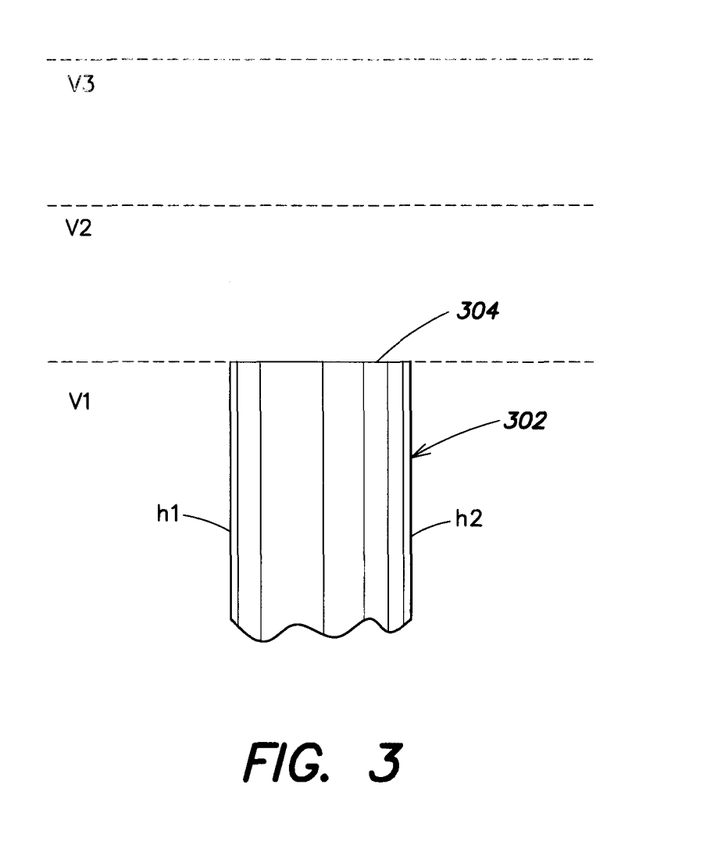
FIG. 3 is a schematic view of an exemplary container in accordance with some embodiments of the present invention.

For example, with respect to FIG. 3, an empty container 302 without a cap may appear as a rectangle when graphically portrayed with scan lines, as shown herein. The bottom edge of the container 302 may be out of view such that the only visible major horizontal feature is a top edge 304 of the container 302. On a histogram, this top edge 304 may be represented as a single spike, and the noise may be ignored after application of the mask. When the resulting signal is searched for peaks, the controller 108, for example, will report only one major feature or peak, which is the top edge 304 of the container 302.

Figure 4:
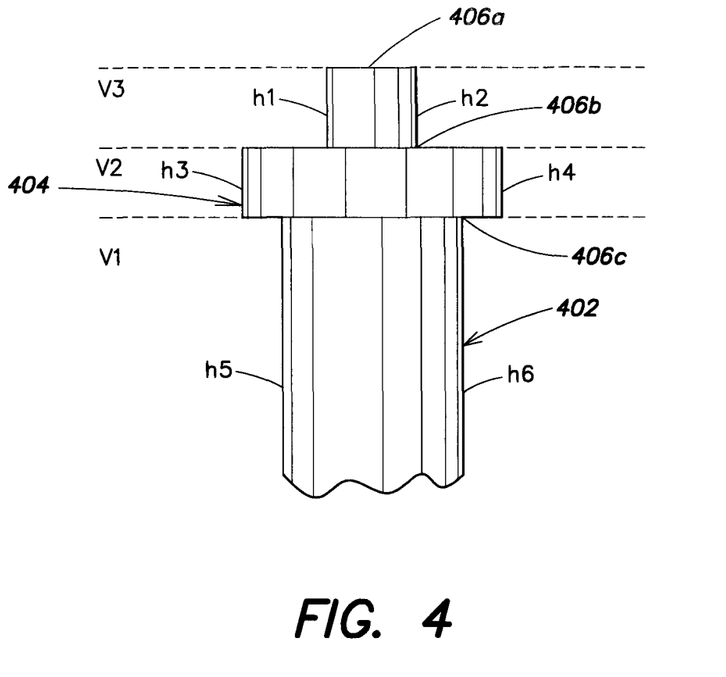
FIG. 4 is a schematic view of an exemplary container with a lid in accordance with some embodiments of the present invention.

In another example, with respect to FIG. 4, an empty container 402 with a cap 404 is graphically provided with scan lines. As indicated in FIG. 4, the container 402 and cap 404 include three major horizontal features: 1. the top of the cap tip 406a, 2. the cap tip/cap base interface 406b, and 3. the cap base/container top interface 406c. Similarly to the container 302 shown in FIG. 3, the bottom edge of the container 402 shown in FIG. 4 may be out of view. On a histogram, the major edges or horizontal features 406a-c may each be represented as a spike or peak, and the noise may be ignored after application of the mask. When the resulting signal is searched for peaks, the controller 108, for example, will report three major features or peaks, which are the top of the cap tip 406a, the cap tip/cap base interface 406b, and the cap base/container top interface 406c.

Then in step S206 the dimensions of the cap 104 and container 106 are determined. In some embodiments, for each detected major horizontal feature, such as the top edge 304 of the container 302 shown in FIG. 3, the width of the feature is measured via the horizontal coordinates of the feature. In some embodiments, the horizontal coordinates used to determine the feature width may be the horizontal coordinates from a pre-determined area below the detected feature, such as the 3-5 scan lines (pixels) below the detected feature, for example. Other suitable areas may be used. With respect to FIG. 3, for example, the container 302 may have one vertical coordinate (at the top edge 304) and two horizontal coordinates h1, h2, for each side of the container 302. The difference between the positions of the horizontal coordinates h1 and h2 may be substantially equal to the width of the container 302.

With respect to FIG. 4, for example, as described above, the container 402 and cap 404 include three major features 406a-c (at three vertical coordinates), and a pair of horizontal coordinates (h1-h2, h3-h4, h5-h6) correspond to each major feature 406a-c. The difference between the positions of each coordinate in the pair of coordinates (i.e., the difference between h1 and h2; the difference between h3 and h4; and the difference between h5 and h6) may be substantially equal to the width of the different features (i.e., cap tip, cap base, and the container, respectively).

In some embodiments, the vertical coordinate and the determined width may form an array, for example an array of n×2, where "n" is the number of detected major horizontal features (indicated by the vertical coordinate). For the container 302 shown in FIG. 3, for example, the array may be a 1×2 array, because only one major horizontal feature (the top edge 304) is detected. For the container 402 shown in FIG. 4, for example, the array may be a 3×2 array, because 3 major horizontal features are detected. Namely, 1. the top of the cap tip 406a, 2. the cap tip/cap base interface 406b, and 3. the cap base/container top interface 406c.

Figure 5:
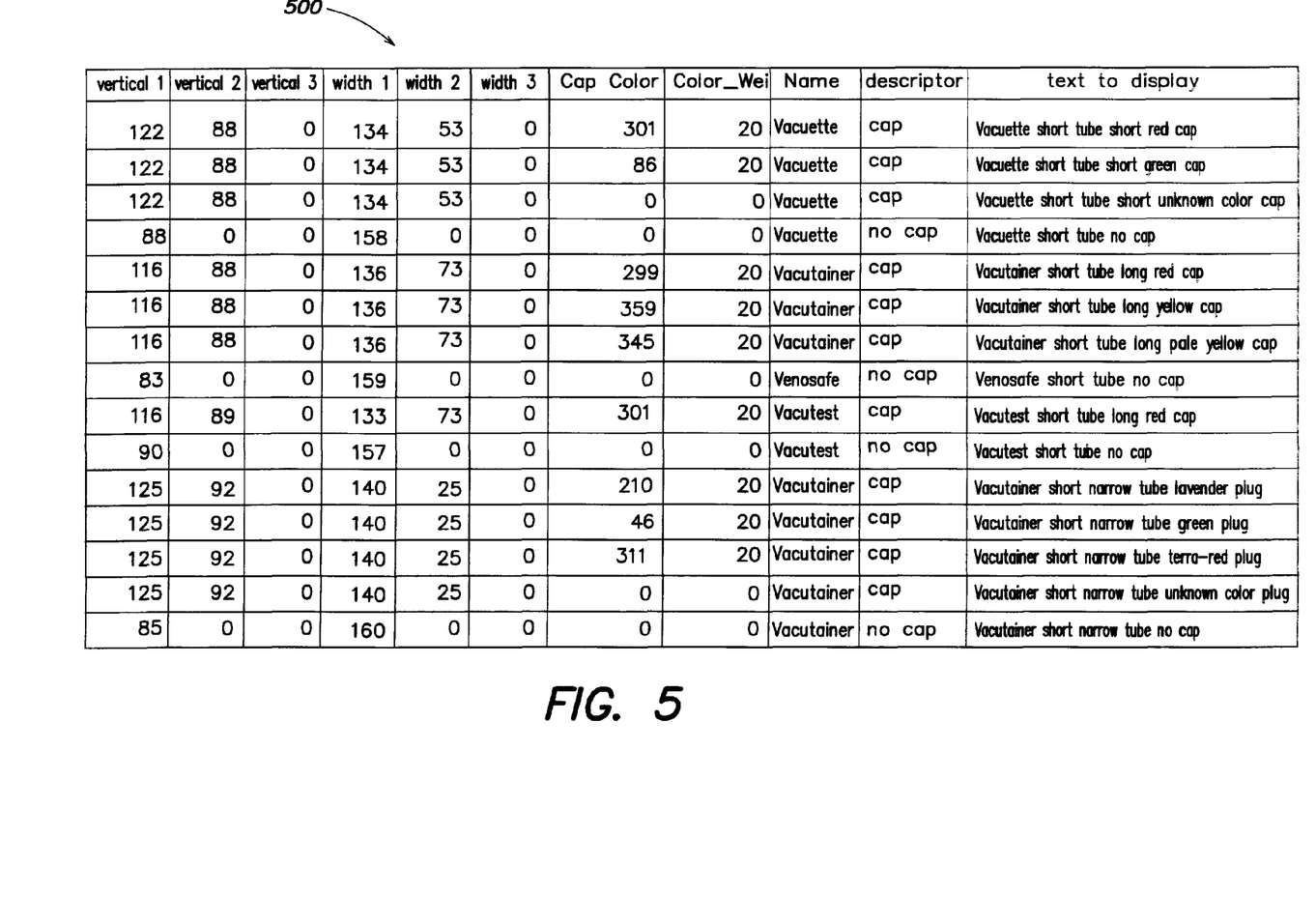
FIG. 5 is a chart depicting an exemplary reference database in accordance with some embodiments of the present invention.

In step S208, the vertical coordinate and the corresponding determined width for each feature may be compared, via the controller 108, for example, to one or more vertical coordinates and widths in a reference database 500 (FIG. 5), which correspond to various containers, caps, and container/cap configurations. The reference database 500 may include a collection of pre-defined vertical and horizontal coordinates, widths, cap color, cap weight, container name, the presence of a cap, and a short description, for example. Other suitable parameters may be stored in the reference database 500.

Then in step S210, the controller 108 may determine, based on the comparison, the presence and/or identity of the container and cap. In some embodiments the presence and/or identity may be determined based on the closest match between the captured image features and the reference database features. In other embodiments, each of the features may be weighted or ranked, such that the weight indicates a more important feature or a more precisely detected feature, for example. In some embodiments the weight may be a weighted co-efficient that may be applied to each corresponding element of the array, for example. Weights may be applied to denote any other suitable rankings.

In some embodiments, the n×2 array may be abstracted or flattened to form a multidimensional vector. Where the physical values are dissimilar, it may be easier to analyze the values using this type of vector abstraction. With dissimilar physical values, only a selected quantifier may be used. The dissimilar physical values may have to be scaled to have an approximately similar influence on the vector position for a typical range of variations. For example, for a color vector measured in angular degrees, with a range of 0 to 360 degrees, for example, the typical variation is around 20, and for a container height of approximately 500 scan lines, the typical variation is around 5. Other ranges and variations may be used. As the color data is more volatile, as indicated by the larger variation, the color data should be scaled down by approximately a factor of 4 (×4), as the variation in color data is about four times greater than the variation in container height. Otherwise, without scaling, color spread might mask more stable reading of height. In the present embodiment, the ×2 array represents the horizontal position of the left and right edges. Because it is desirable in this embodiment to determine width, the n×2 array may be collapsed into n×1, as the number of vertical segments and their width. Then the total vector dimension may be n×1+C, where C is number of color vectors.

Additionally, the values in the reference database may be represented as a pre-defined collection of coordinates. Then each element represented as a coordinate or width may be compared in multidimensional space to the reference coordinates. In some embodiments, the comparison may include calculating the distance from the multidimensional vector to each of the reference coordinates; and the shortest distance may be indicative of the closest match between the captured image features and the reference features, for example. Other comparative methods may be used.

In some embodiments, the color, or a predominant color, of the cap may be another feature that may be used to detect and identify caps. The color may refer to the cap tip 406a, for example the segment between h1, h2, 406a and 406b of the cap 404 shown in FIG. 4, or any other suitable cap feature. In some embodiments, the cap may include one or more predominant colors. For example, some caps may have one predominant color and large spots in a second color. In some embodiments, the predominant and second major colors may be graphically represented on a histogram, for example. For example, the histogram may include color vectors for the whole area of interest, thereby resulting in one or more peaks on the histogram. The predominant color may be represented by the largest peak, and the second major color may be represented by the second largest peak on the histogram. The decreasing size of the peaks may be indicative of the decreasing portion of the area of interest having that color. In some embodiments, the controller 108 may compare the image color feature to the reference color feature, which may also be included in the reference database (FIG. 5), to determine the presence and/or identity of the cap. In other embodiments, each of the colors may be translated into color vectors, such as an NTSC color vector, for example. In some embodiments, the predominant and second major colors may be determined, for example, via the direction of the color vector. This color vector may be added to the multidimensional vector, described above, as an additional dimension. As described above, the color vector may be a weighted feature.

In some embodiments the controller 108 may calculate a ratio of the vertical coordinate and the corresponding determined width for each feature. The ratio may be useful in that the ratio may be constant and not susceptible to changes resulting from any visual manipulations of the image (i.e. zoom, proximity, parallax). The use of these ratios may also reduce the number of imaged values compared to reference values in the database, because instead of comparing both the vertical coordinate and the determined width to the reference values, the singular ratio value may be compared to the reference values, for example. Decreasing the number of comparisons may in effect increase the efficiency of the detection and identification processes.

The foregoing description discloses only exemplary embodiments of the invention. Modifications of the above disclosed apparatus and method which fall within the scope of the invention will be readily apparent to those of ordinary skill in the art.

Accordingly, while the present invention has been disclosed in connection with exemplary embodiments thereof, it should be understood that other embodiments may fall within the spirit and scope of the invention, as defined by the following claims.

The invention claimed is:

1. A method for determining the presence of a cap on a container comprising:
capturing an image of an object;
extracting an area of interest from the image;

determining from the image a predominant primary color and a secondary color; and determining from the image a position of one or more edges of the object;

wherein the determining a predominant primary color and a secondary color comprises translating the primary color and the secondary color into respective color vectors, creating a multidimensional vector based on the determined edge positions, adding the color vectors to the multidimensional vector, and determining the presence of a cap based on a comparison of the multidimensional vector reference data stored in a reference database including at least one of a vertical coordinate, a horizontal coordinate, a width, or a cap color.

2. The method of claim 1 further comprising:
determining the type of cap positioned on a container based on a comparison of the one or more edge positions to reference data.

3. The method of claim 2 wherein determining the one or more edge positions further comprises:
determining at least one vertical coordinate and at least one pair of horizontal coordinates for each of the determined edge positions.

4. The method of claim 3 wherein a difference between the pair of horizontal coordinates is a width measurement.

5. The method of claim 4 further comprising:
determining a ratio of the width measurement to the vertical coordinate.

6. The method of claim 5 further comprising:
comparing the ratios for each of the determined edges to reference data.

7. The method of claim 5 further comprising:
comparing the ratios for the edges in a cap region of the area of interest to reference data.

8. The method of claim 7 further comprising:
determining the type of cap based on the comparison of the ratios of the edges in the cap region to reference data.

9. The method of claim 2 further comprising:
converting the captured image into a 2D array.

10. The method of claim 2 further comprising:
applying a filter to the extracted area of interest.

11. The method of claim 2 further comprising:
extracting at least one color from the area of interest.

12. The method of claim 11 wherein the color is a color vector.

13. The method of claim 2 wherein the one or more edge positions each include a ranking.

14. A system for determining the presence of a cap on a container comprising:
an image capture apparatus adapted to capture an image of an object, wherein the image is represented as a 2-D array of intensities of light; and a controller coupled to the image capture apparatus, wherein the controller is adapted to extract an area of interest from the image; determine a predominant primary color and a secondary color; determine a position of edges of the object; compare the edge positions or the predominant primary color and the secondary color to reference data; and wherein the determining a predominant primary color and a secondary color comprises translating the primary color and the secondary color into respective color vectors, creating a multidimensional vector based on the determined edge positions, and adding the color vectors to the multidimensional vector, and wherein the controller is adapted to determine the presence of a cap based on the comparison of the multidimensional vector to reference data stored in a reference database including at least one of a vertical coordinate, a horizontal coordinate, a width, or a cap color.

15. The system of claim 14 wherein the controller is adapted to determine the type of cap positioned on a container based on a comparison of the edge positions to reference data.

16. The system of claim 14 wherein the system includes one or more image capture apparatuses adapted to capture the image of one or more objects.

17. The system of claim 14 wherein the reference data includes a pre-defined collection of coordinates.

18. The system of claim 14 wherein the controller is adapted to extract a color from the area of interest.

* * * * *